F. W. OFELDT.
VALVE GEAR.
APPLICATION FILED DEC. 11, 1916.

1,238,560.  Patented Aug. 28, 1917.
4 SHEETS—SHEET 1.

WITNESSES:

INVENTOR.
Frank W. Ofeldt
BY
ATTORNEY.

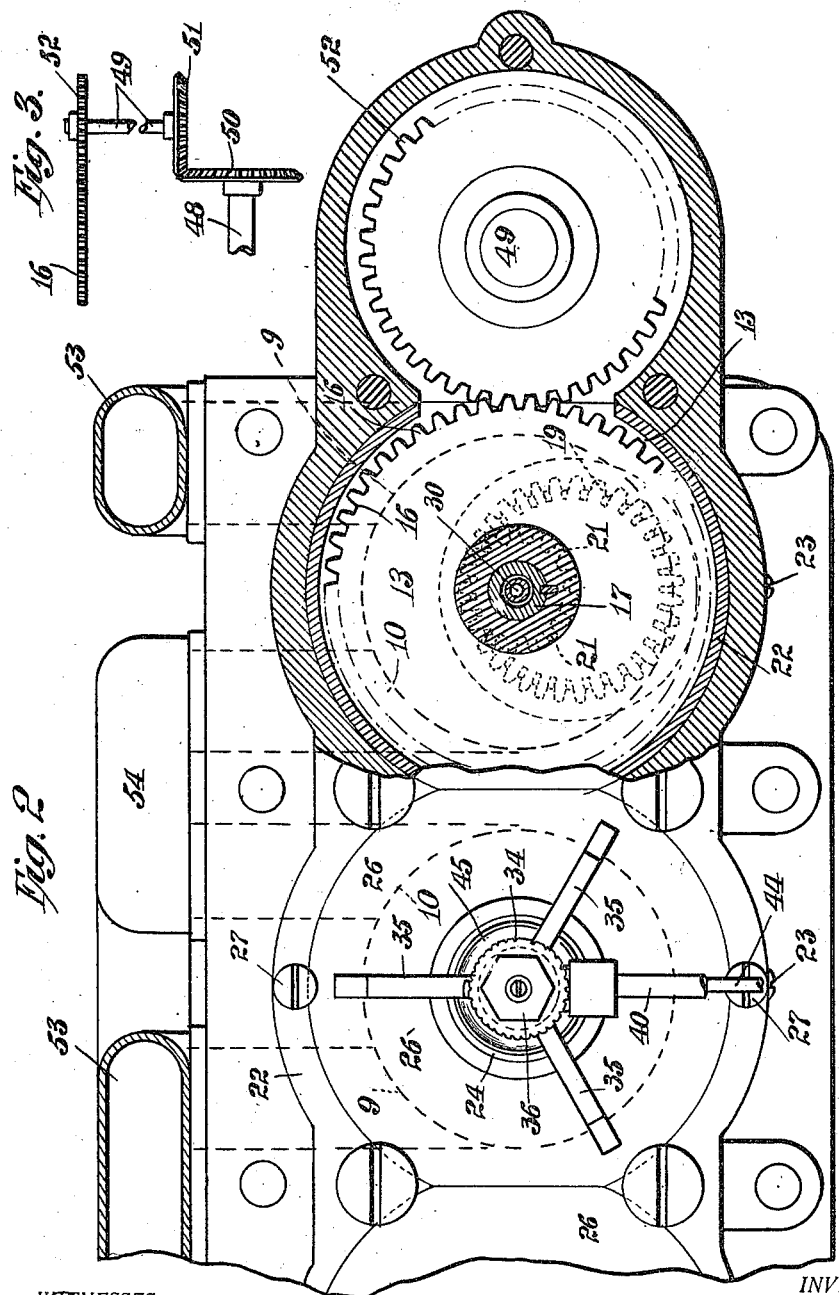

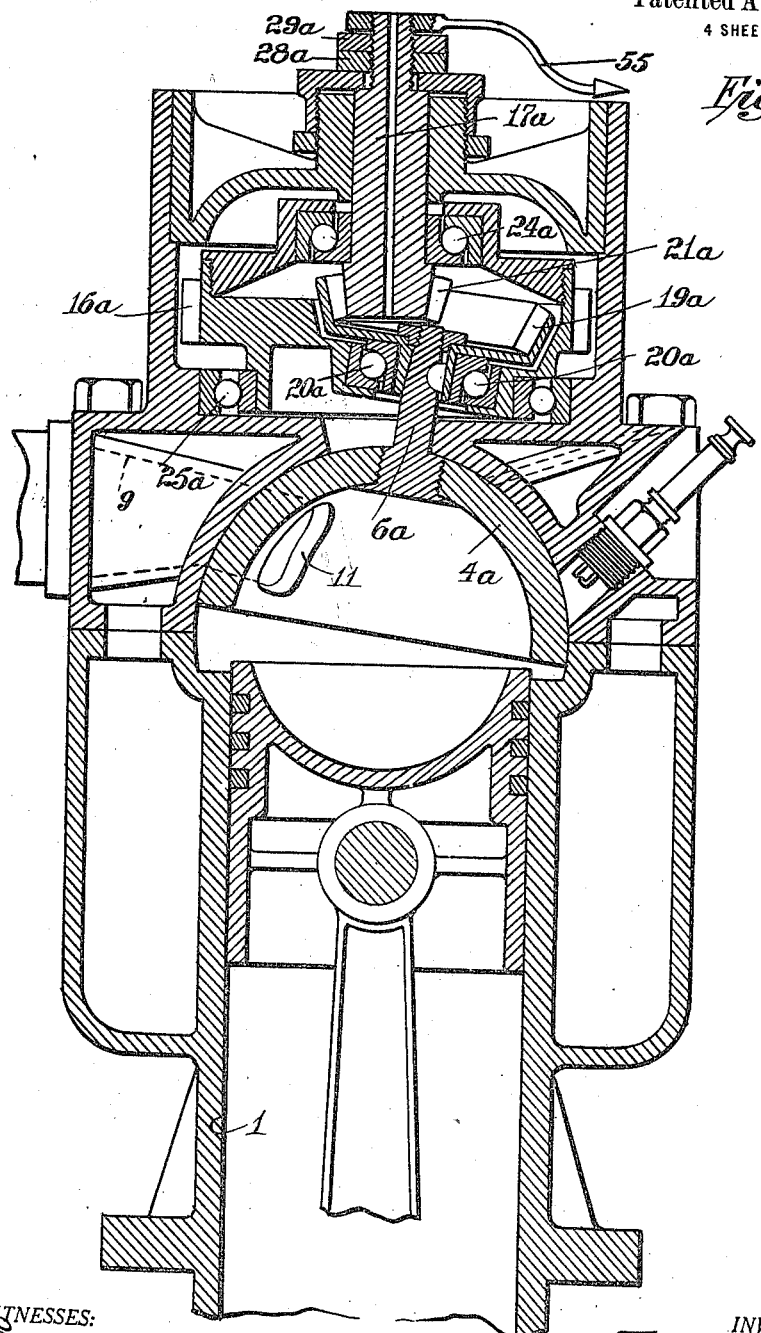

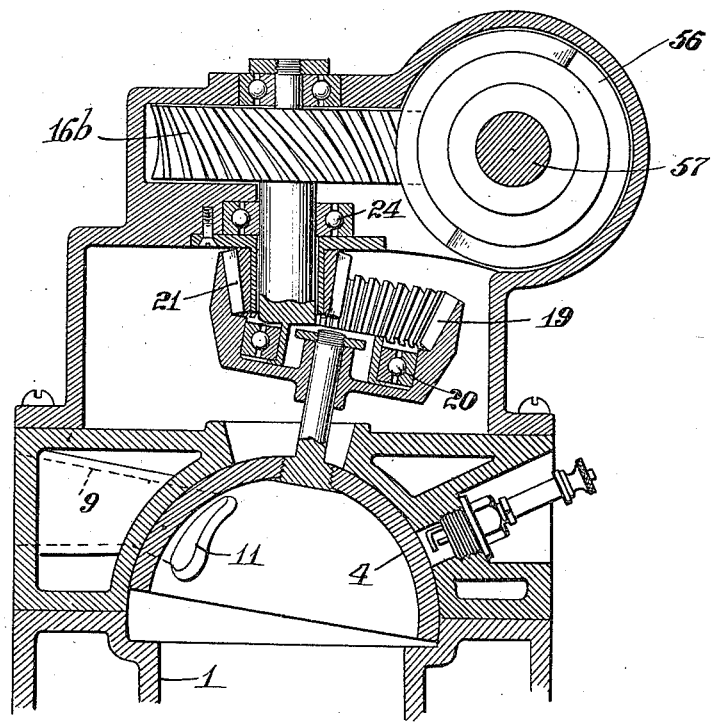

UNITED STATES PATENT OFFICE.

FRANK W. OFELDT, OF JERSEY CITY, NEW JERSEY, ASSIGNOR TO O. & B. COMPANY, OF DRAVOSBURG, PENNSYLVANIA, A CORPORATION OF DELAWARE.

VALVE-GEAR.

1,238,560.  Specification of Letters Patent.  Patented Aug. 28, 1917.

Application filed December 11, 1916. Serial No. 136,157.

*To all whom it may concern:*

Be it known that I, FRANK W. OFELDT, a citizen of the United States of America, and a resident of Jersey City, county of Hudson, and State of New Jersey, have invented certain new and useful Improvements in Valve-Gear, of which the following is a specification.

My invention relates to improvements in valve gear, the improved valve gear herein illustrated and described, being primarily intended for internal combustion engines, particularly internal combustion engines of the four cycle type; although my invention is applicable also to valve gear for two-cycle engines, steam and compressed air engines and the like, compressors, pumps, and other machines in which valve gear of a nature analogous to valve gear of internal combustion engines, steam engines, compressors, pumps, etc., is employed.

In a prior patent application Serial No. 95,996 filed May 8, 1916, I have illustrated and described various valve gears, wherein the valve has what I termed a "gyratory" motion, i. e., a wabbling motion. In general, in the valve gear illustrated in my said prior application, the valve has also, in addition to such wabbling motion, a rotary motion. In some cases the valve ports are opened and closed by the gyratory motion of the valve, the accompanying rotary motion being incidental, and provided principally to avoid possible scoring of the bearing surfaces of the valve and cylinder head, and to insure that the valve shall "wear in" during use, also to distribute lubricant over the bearing surfaces, also for other reasons; while in other cases the motion of the valve is rotary with incidental gyratory motion, the purpose of the gyratory motion in such cases being much the same as above stated with reference to the rotary motion of other type of valve gear. In the various valve gears herein shown and described, the valve is of the second type above mentioned; that is to say it is primarily a rotary valve, having incidental gyratory motion. But while this gyratory motion is not essential to the valve action *per se*, it is, nevertheless, very important, not only in order that there shall be no scoring of the bearing surfaces of the valve and cylinder head, and that the valve shall "wear in" during use, but also that lubricant shall be distributed thoroughly between the bearing surfaces of the valve and cylinder head, and also for other reasons. The valve gears herein illustrated and described involve improvements upon, and modifications of, certain of the valve gears illustrated and described in my said prior application.

My invention consists in a valve gear wherein a valve has a rotary motion, for performing its valve functions, with incidental gyratory motion, for the purposes above stated, and other purposes explained hereafter; in the novel construction of the valve gear, and in other features hereinafter described and particularly pointed out in the appended claims.

The objects of my invention are to improve and simplify valve gear, particularly valve gear of internal combustion engines; to provide a valve gear which shall close and open its port or ports positively, and shall be capable of so doing at very high engine speed, and which shall not require lifting from its seat during the performance of its valve functions, nor shall it be difficult of lubrication, or subject to material wear during long periods of use; to provide a valve and valve gear wherein port opening and port closure shall be rapid, with large port area open during the open period; to provide a valve gear which shall be absolutely silent in operation; to avoid material motion of the valve while exposed to great pressure; to provide valve operating mechanism which shall move the valve smoothly; to provide for efficient lubrication of the valve; to provide effective means for taking up wear, if any; to provide effective means for injection of fuel, such for example as fuel oil, into the engine cylinder, as a spray, or finely divided mist, and the ignition of the fuel so injected; and generally to provide a type of valve and valve gear readily adaptable to existing types of engines, and which shall be compact, neat in appearance, durable and reliable.

I will now proceed to describe my invention with reference to the accompanying drawings, and will then point out the novel features in claims. In said drawings:

Fig. 2 shows a partial top view and partial horizontal section of a multi-cylinder engine provided with my improved valve gear, the section being taken on the line 2—2 of Fig. 1.

Fig. 3 is a more or less diagrammatic view illustrating, in vertical elevation, the drive of the valve gear from the crank shaft of the engine.

Fig. 4 shows a central vertical section of the upper portion of an engine cylinder provided with a valve gear of the general nature of that shown in Fig. 1, but differing therefrom somewhat in details.

Fig. 5 shows a central vertical section of the upper portion of an engine cylinder having valve gear similar to that shown in Fig. 1, except that the valve stem is not provided with a sprayer, and except that the valve shaft is driven by worm gearing.

Figure 1:
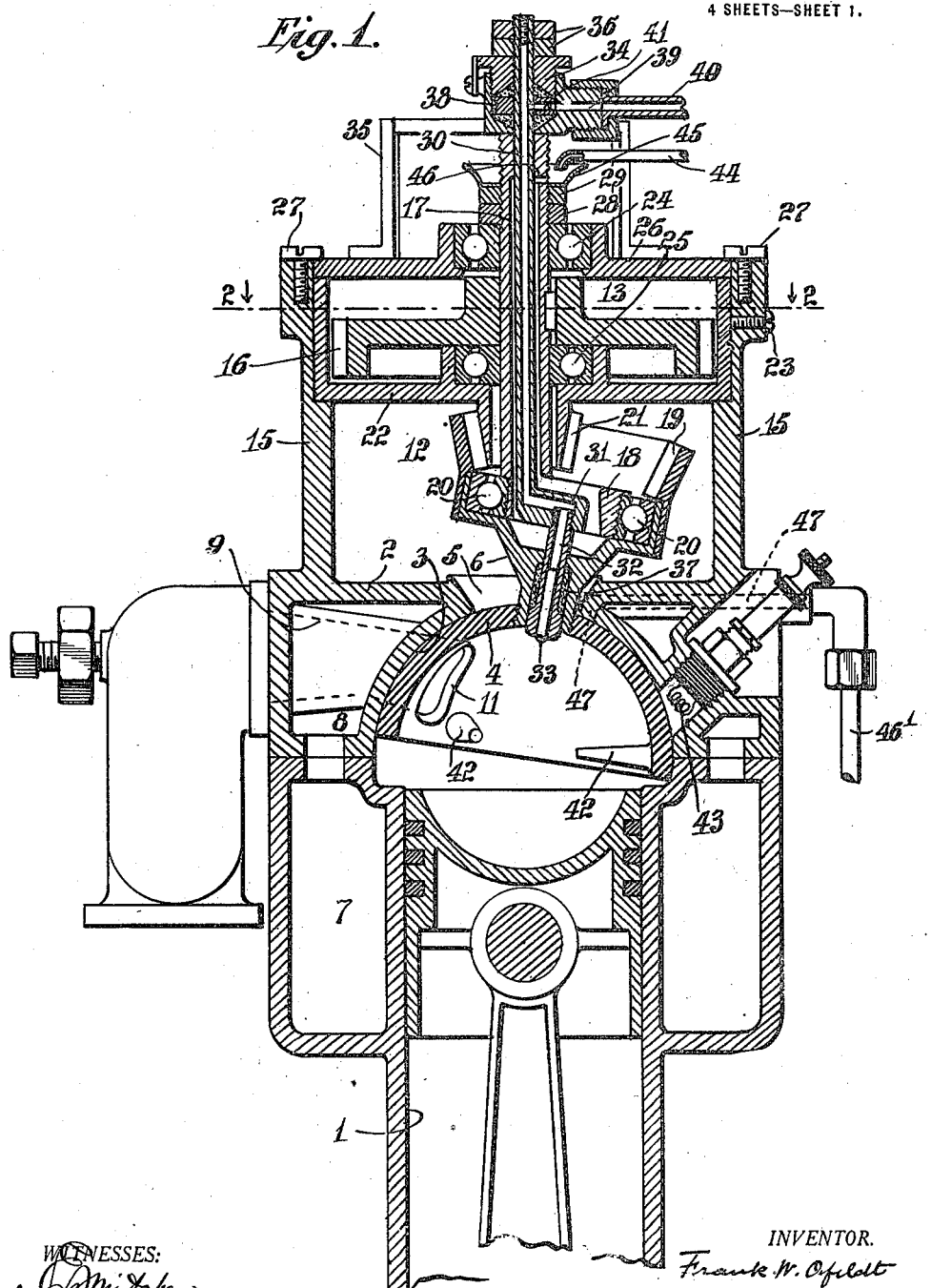
Figure 1 shows a vertical transverse section of the upper portion of an internal combustion engine cylinder provided with my improved valve gear, including means for the injection of fuel through the valve into the engine cylinder.

Referring first to Fig. 1, 1 designates an engine cylinder having a separable head 2 provided internally with a spherically curved surface 3 adapted to form a seat for the correspondingly spherically curved valve 4. The head 2 has in it a central opening 5 through which the stem 6 of the valve protrudes. The cylinder and cylinder head are shown as provided with the usual water jacket spaces 7 and 8, connected as shown. In the cylinder head admission and exhaust ports are provided, leading from the exterior of the cylinder head to the valve seat 3. Owing to the plane of section on which Fig. 1 is taken but one of these ports (admission port 9) can be shown in that figure, and such port can be shown only in dotted lines; but in Fig. 2 the exhaust port, 10, as well as the admission port, 9, is indicated; and as appears from that figure, these two ports are each distant about 45° (measuring from their centers) from the imaginary transverse plane passing through the axis of the cylinder 1; in other words, these ports are set "quartering". The valve, 4, has a port 11, adapted to register first with the exhaust port 10 and then with the inlet port 9, during rotation of the valve 4.

The mechanism for rotating and gyrating the valve 4 is located in chambers 12 and 13 provided in the upper extension 15 of the cylinder head. Such mechanism comprises a spur gear 16, driven as hereinafter described from the crank shaft of the engine, and keyed to a vertical shaft 17 (shown in this instance as hollow) which shaft has suitable bearings as hereinafter described, and is provided at its lower end with a crank arm 18 carrying an internal bevel gear 19; a suitable ball bearing structure 20 intervening between the said crank 18 and the gear 19. The stem 6 of valve 4 is secured to the internal bevel gear 19 so as to in effect form a part thereof.

A bevel pinion 21 intermeshes with internal bevel gear 19, and is carried by the plate 22 supported by the upper extension 15 of the cylinder head. It will be obvious that, owing to the bearing intervening between crank 18 and gear 19 carrying the valve stem 6 and the valve 4, rotation of the shaft 17 would, except for intermeshing gears 19 and 21, cause mere gyration of the valve 4; but owing to the intermeshing of gears 19 and 21, and to the fact that gear 21 is stationary, rotation of the crank 18 will also cause rotation of gear 19 and valve 4; and since the ratio of gears 19 and 21 is two to one, valve 4 will rotate at half the crank shaft speed in the engine, supposing gear 16 to be driven at crank shaft speed.

Plate 22 is normally stationary, being locked in place by suitable means, as for example by one or more set screws 23; but this plate 22 is nevertheless rotatable, upon release by the set screw or screws 23, for the purpose of adjustment of position of the valve 4 with reference to the admission and exhaust ports in the cylinder head; for obviously, slight rotation of this plate 22 will shift the position of the valve 4 so as to affect the timing of the valve. Ball bearings 24 and 25 are provided for valve gear shaft 17, in the top plate 26 and in plate 22. The top plate 26 rests upon the plate 22, and so upon the upper extension 15 of the cylinder head, and said top plate is held in place, in the construction shown by screws 27. The upper end of shaft 17 is screw threaded, and upon it are screw nuts 28 and 29, whereby the shaft 17 is supported in such manner that it may be raised or lowered to adjust the seating of valve 4 in valve seat 3. Naturally, the ball bearings 24 and 20 through which the valve 4 is thus supported, afford some slight vertical play for the valve; and this is desirable, both since it permits the valve to be forced against its seat by fluid pressure exerted against the valve, without transmission of shocks to the mechanism for operating the valve, and also because the very slight play of the valve with respect to its seat, thus permitted, promotes the flow of lubricant between the bearing surfaces of the valve and its seat. I will explain hereinafter one means for supplying lubricant to these bearing surfaces.

In the case of an engine intended to operate upon more or less heavy hydrocarbon oils as fuel, it is desirable that the fuel oil be sprayed into the engine cylinder. The valve shaft 17 and valve stem 6 constitute convenient means for location of a fuel supply duct and sprayer. As above stated, the valve shaft 17 is hollow. The crank 18 forming a part of this valve shaft, has an open center. Through the shaft 17 passes a fuel supply duct 30 terminating at its lower end in an enlargement 31 occupying in part the open center of the crank 18; and to this enlargement 31 is connected an extension duct 32, passing through the center of the valve stem 6, and provided at its lower end with a spraying device 33, which I have indicated in exterior view only, and without attempt to show its internal construction; various oil spraying devices suitable for the purpose being well known. At its upper end fuel supply duct 30 passes through a stuffing box 34 supported by a suitable stool 35 from the plate 26, and above this stuffing box 34 supporting nuts 36 are provided. In the valve stem 6 a packing recess 37 is provided, the duct 32 being movable longitudinally in such recess. As will be seen, the construction is such that by drawing up the nuts 36, the packing in space 37 may be compressed and thus a tight joint around duct 32 may be assured.

The stuffing box 34 comprises an externally grooved washer 38 surrounding duct 30, suitable packing material being provided on both sides of this washer. The groove of this washer communicates, through a bore 39, with a fuel supply pipe 40; and washer 38 has in it a bore 41 connecting its exterior groove with the bore of fuel duct 30. It will be seen that liquid fuel supplied through pipe 40 and duct 30—32 to sprayer 33, will be sprayed into cylinder 1. It may be assumed that liquid fuel is supplied under pressure to pipe 40 by a pump, not shown, operating in synchronism with the engine, and timed so as to inject the fuel through duct 30—32 into the engine cylinder at the precise time at which such injection should occur. Means for so injecting the fuel are well known; and sprayers which will spray the fuel so injected under pressure are also well known.

In engines which operate by injection of fuel in the manner described, preignition is impossible, because during the suction stroke of the engine only air is admitted and during the compression stroke of the engine only air is compressed, no fuel being admitted, and no combustion occurring, therefore, until injection of the fuel occurs as above described. While the air so admitted to the engine cylinder may be compressed to so high a degree as to insure ignition of the injected fuel by reason of the high temperature of the air due to its compression, in general such high compression is not now thought desirable, and instead it is thought better to insure ignition of the injected fuel by contact of the injected spray with some incandescent point or points within the combustion chamber. I have indicated the valve 4 as provided with a plurality of projections 42 which will become heated during the first few moments of operation of the engine, and will thereafter serve to ignite the fuel upon injection thereof into the engine cylinder. For ignition of the fuel during the starting and heating up of the engine, an ordinary ignition plug may be provided together with usual circuits and jump spark producing apparatus. But I have thought it better to provide instead a hot wire igniter 43 located within a suitable pocket or recess formed in the wall of the cylinder head, with which recess the port 11 of the valve will register from some time prior to some time after the proper period for injection of fuel. By means of this igniter 43 the fuel may be ignited during the starting and heating up of the engine; such ignition being facilitated by the fact that the valve is then so tilted that the spray stream is directed obliquely toward the igniter; but if the vapor of the heavy oil upon which the engine is intended to operate normally, does not spread into the pocket of this hot wire igniter 43, sufficiently to insure ignition, the engine may be started on gasolene, the vapor of which will spread into such pocket; and then, after the engine becomes heated sufficiently, the heavier fuel oil may be turned on in lieu of the gasolene.

The fuel supply duct 30 does not completely fill the hollow bore of the valve shaft 17; space being provided between the outer surface of this fuel duct 30, and the wall of the bore of shaft 17, for the flow of lubricant to lubricate the gear teeth of the gears 19 and 21 and to lubricate the ball bearing 20. A pipe 44 supplies lubricating oil to a cup 45 communicating, through a hole 46, with the annular lubricant space of shaft 17; the lubricant so supplied flowing down through that shaft into the hollow center of the crank 18 and into the recess 45 provided at the top of valve stem 6, and thence flowing centrifugally to the teeth of gears 19 and 21 and ball bearing 20. The oil will also reach duct 32 where it passes through stuffing box 37. For the supply of lubricant to the bearing surfaces of valve seat 3 and valve 4, an oil supply pipe 46 is provided, which communicates through a duct 47, formed in the cylinder head, with the valve seat 3. Owing to the combined rotary and gyratory motion of this valve, and to its slight movement toward and from its seat, during the operation of the engine, above referred to, the lubricant will be distributed very thoroughly indeed over the bearing surfaces of valve and valve seat.

It is well known that a valve having a pure rotary motion tends to wear away from its seat, and many wear unevenly, so that grinding in may be required from time to time, to insure proper seating. But a valve having a combined rotary and gyratory motion, tends to wear itself to its seat; the motion being precisely that which would be used to best advantage in grinding the valve to its seat. The result is that in my improved valve gear herein described, regrinding of the valve will never be necessary in ordinary use, but to the contrary the valve will tend to seat better and better as use continues.

Referring to Figs. 2 and 3. In Fig. 2, three cylinders of a multi-cylinder engine are indicated (one of them being indicated fragmentarily only) together with means for driving the valve gear of each cylinder. In Fig. 3, 48 designates the crank shaft of the engine, 49 a vertical shaft driven from the crank shaft by gears 50 and 51, and 52 designates a spur gear on shaft 49 and meshing with the spur gear 16 of the proximate engine cylinder. The gears 16 of the several engine cylinders intermesh in series, forming a continuous gear train from the first cylinder to the last. Since the direction of rotation of the gears 16 of adjacent cylinders will be opposite, the direction of rotation of the corresponding valves 4 of adjacent cylinders will be opposite, and hence the positions of the inlet and exhaust port 9 and 10 of each cylinder will be opposite that of the inlet and exhaust ports of the adjacent cylinders; and the inlet manifolds 53 and exhaust manifolds 54 will be correspondingly formed.

Referring now to Fig. 4. This figure shows a valve gear in general similar to that shown in Fig. 1, in that the valve, here designated by numeral $4^a$, is primarily a rotary valve, with incidental gyratory motion. But the mechanism for rotating and gyrating the valve is somewhat different from that shown in Fig. 1. The engine cylinder, cylinder head, and ports, are substantially the same as shown in Fig. 1. $16^a$ designates a spur gear for communicating motion to the valve, said gear being driven by substantially the same means as indicated in Figs. 2 and 3. This gear has ball bearings $25^a$ and $24^a$ and carries, by means of a ball bearing $20^a$, an internal bevel gear $19^a$ meshing with a stationary pinion $21^a$, mounted upon a shaft $17^a$ which is stationary except for purposes of adjustment, as explained hereafter, instead of being rotatable, as is the shaft 17 of Fig. 1. Gear $19^a$ carries the stem $6^a$ of the valve $4^a$. Screw nuts $28^a$ and $29^a$ are provided whereby the shaft $17^a$ is supported and locked in position; and said shaft $17^a$ supports, by means of the ball bearing $24^a$, the gear $16^a$, and so supports, by means of a ball bearing $20^a$, the gear $19^a$, and the valve stem $6^a$ and valve $4^a$. In this form of valve gear, as will be seen, the valve $4^a$ is rotated directly by the gear $19^a$, and by reason of the intermeshing of that gear $19^a$ with the stationary pinion $21^a$; the arrangement in this respect being the reverse of the arrangement shown in Fig. 1; but the motion of the valve $4^a$ is the same as that of the valve 4 in Fig. 1, and the valve action is the same. Each of these two forms of valve gear possesses certain advantages of its own, one important advantage of the valve gear shown in Fig. 1 being that the main bearings, 24 and 25, are well removed from the heat of the engine cylinder.

In the arrangement shown in Fig. 4, by releasing the nuts $28^a$ and $29^a$, the shaft $17^a$ may be turned as may be required for timing of the valve $4^a$, after which, the nuts $28^a$ and $29^a$ being tightened again, the timing will remain fixed. An indicating pointer 55 may be provided on shaft $17^a$, such pointer being arranged to coact with a suitable scale formed on the top of the cylinder head, whereby the timing of the valve may be indicated according to such scale.

The valve gear shown in Fig. 5 is similar to that shown in Fig. 1, except that the main gear here designated by numeral $16^b$, is a worm gear, or screw gear, and is driven by a worm or screw 56 mounted on a shaft 57 which obviously will be parallel with the crank shaft of the engine. Obviously, in a multicylinder engine provided with such valve gear, all of the gears $16^b$ may be driven by appropriate worms 56 on this shaft 57; and according as the pitch of the several worms 56 is in the same direction or in the opposite direction, alternately, alternate valves $4^a$ may be rotated in the same direction, or in opposite directions, as may be desired.

Inasmuch as in my said prior application Serial No. 95,996, I have claimed broadly means for imparting a gyratory motion to a valve, also gyratory motion coupled with incidental rotary motion, I have not claimed such invention herein; but herein I have claimed means for imparting positive rotary motion to the valve, with incidental rotary motion, together with features of construction and arrangement not claimed in my said prior application.

What I claim is:

1. The combination with an engine cylinder having one or more ports, of a valve for such port or ports adapted for a combined rotary and gyratory motion, and means for communicating a positive rotary motion to said valve coupled with a gyratory motion.

2. The combination with an engine cylinder having in its head a recess of curvilinear cross-section and having a port or ports communicating with such recess, of a valve in such recess of a section corresponding to the section of the recess, and adapted for both rotation and gyration in said recess, to coact with such port or ports, and means for communicating to said valve a positive rotary motion coupled with a gyratory motion.

3. The combination with an engine cylinder having admission and exhaust ports, of a valve for said ports itself having a port adapted to register with said admission and exhaust ports, and means for communicating to said valve a positive rotary motion coupled with a gyratory motion.

4. The combination with an engine cylinder having a valve seat in which are one or more ports, of a valve adapted for both rotary and gyratory motion with respect to said seat and for coaction with said port or ports, and also for slight motion toward and from its seat, and means for communicating positive rotation to said valve coupled with gyratory motion, said means arranged to permit slight motion of said valve toward and from its seat.

5. In a four-cycle internal combustion engine the combination with an engine cylinder having a valve seat in which are admission and exhaust ports, a piston, a connecting rod, crank shaft, and a valve adapted for both rotary and gyratory motion with respect to said seat and for coaction with said ports, of means for communicating positive rotary motion to said valve at half crank shaft speed and for causing said valve also to gyrate.

6. The combination with an engine cylinder having one or more ports, of a valve for such port or ports provided with an injection device, and operating means for said valve adapted for imparting positive rotary motion thereto and comprising a duct leading to said injection device.

7. The combination with an engine cylinder having one or more ports, of a valve for such port or ports provided with an injection device, and operating means for said valve adapted for imparting gyratory motion thereto and comprising a duct leading to said injection device.

8. The combination with an engine cylinder having a valve seat in which are admission and ignition ports, of a valve for said ports arranged to open said admission and ignition ports in succession, and adapted for both rotation and gyration, and operating means for said valve arranged to impart thereto a combined rotary and gyratory movement.

9. The combination with an engine cylinder having a valve seat in which are admission and ignition ports, of a valve for said ports arranged to open said admission and ignition ports in succession, and provided with an injection device, and operating means for said valve arranged to impart thereto a combined rotary and gyratory motion and to so position the valve, when the ignition port is open, that the injection device is directed toward the ignition port.

10. The combination with an engine cylinder having a valve seat in which is an ignition port, of a valve for said port arranged to open and close said ignition port, and provided with an injection device, and operating means for said valve including means for imparting a gyratory motion to the valve arranged to so position the valve, when the ignition port is open, that the injection device is directed toward the ignition port.

11. The combination with an engine cylinder having one or more ports, of a valve for such port or ports provided with a projecting stem working through an opening in the wall of said cylinder, valve operating means arranged to impart gyratory motion thereto, said valve stem provided with an injection device and a supply duct therefor, and means for supplying fluid to said duct.

12. The combination with an engine cylinder having one or more ports, of a valve for such port or ports provided with a projecting stem working through an opening in the wall of said cylinder, valve operating means arranged to impart rotary and gyratory motion thereto, said valve stem provided with an injection device and a supply duct therefor, and means for supplying fluid to said duct.

13. The combination with an engine cylinder having a valve seat and one or more ports therein, and an opening for the passage of a valve stem, of a valve coöperatively related to said seat and adapted for coaction with such port or ports and having a stem projecting through said valve seat opening, said engine cylinder having beyond said valve stem opening a divided valve gear chamber, a valve gear shaft passing through such chamber, means in one said part of said chamber for imparting rotary motion to said shaft, and means in the other said portion of such chamber for imparting gyratory motion to said valve, such latter means being operated by said shaft.

14. The combination with an engine cylinder having a valve seat and one or more ports therein, and an opening for the passage of a valve stem, of a valve coöperatively related to said seat and adapted for coaction with such port or ports and having a stem projecting through said valve seat opening, said engine cylinder having beyond said valve stem opening a divided valve gear chamber, a valve gear shaft passing through such chamber, means in one said part of said chamber for imparting rotary motion to said shaft and means in the other portion of such chamber for imparting a combined rotary and gyratory motion to said valve, such latter means being operated by said shaft.

15. The combination with an engine cylinder having a valve seat and one or more ports therein, a valve in coöperative relation with such seat and ports, and means for communicating combined rotary and gyratory motion to said valve comprising a rotatable member having a rotary eccentric connection with said valve, whereby a gyratory motion is communicated to the valve, and two intermeshing gears, of different speed ratios, one connected with said valve and arranged to move with respect to the other gear, such other gear being so held as to enforce rotation of such first mentioned gear during gyration of the valve.

16. The combination with an engine cylinder having a valve seat and one or more ports therein, of a valve in coöperative relation with such seat and port or ports, and operating means for said valve comprising a valve shaft provided with a crank, means for rotating said shaft, said shaft having a rotatable connection with the valve, whereby gyratory motion of said valve is enforced, and two intermeshing gears of different speed ratios, one carried by said valve and caused to gyrate therewith, the other such gear being stationary, whereby as the valve gyrates it is also caused to rotate.

17. The combination with an engine cylinder having a valve seat and one or more ports therein, of a valve in coöperative relation with such seat and port or ports and adapted for a combined rotary and gyratory motion, said valve having a stem projecting through an opening in the valve seat, a rotary valve shaft provided with a crank, said shaft having a rotary bearing with respect to the valve, a bevel gear carried by said valve stem and another bevel gear intermeshing with said first mentioned bevel gear, and normally held against rotation, whereby as gyratory motion of the valve is caused by said crank, the valve is also caused to rotate.

18. The combination with an engine cylinder having a valve seat and one or more ports therein, of a valve in coöperative relation with such seat and port or ports and adapted for a combined rotary and gyratory motion, said valve having a stem projecting through an opening in the valve seat, a rotary valve shaft provided with a crank, said shaft having a rotary bearing with respect to the valve, a bevel gear carried by said valve stem and another bevel gear intermeshing with said first mentioned bevel gear, and normally held against rotation, whereby as gyratory motion of the valve is caused by said crank, the valve is also caused to rotate, said last mentioned gear being rotatable for timing the valve action.

19. The combination with an engine cylinder having a valve seat and one or more ports therein, of a valve in coöperative relation with such seat and port or ports, and adapted for a combined rotary and gyratory motion, said valve having a stem projecting through an opening in said seat and provided with a central recess and with a bevel gear, a valve shaft provided with a crank located within the said central recess of said valve stem, and having a rotary-bearing connection with said valve stem, means for rotating said shaft, and a normally fixed bevel gear intermeshing with the bevel gear carried by said valve stem, whereby as the valve gyrates it is also caused to rotate.

20. The combination with an engine cylinder having a valve seat and one or more ports therein, of a valve in coöperative relation with such seat and port or ports, and adapted for a combined rotary and gyratory motion, said valve having a stem projecting through an opening in said seat and provided with a central recess and with a bevel gear, a valve shaft provided with a crank located within the said central recess of said valve stem, and having a rotary-bearing connection with said valve stem affording support for said valve, means for rotating said shaft, and a normally fixed bevel gear intermeshing with the bevel gear carried by said valve stem, whereby as the valve gyrates it is also caused to rotate.

21. The combination with an engine cylinder having a valve seat and one or more ports therein, of a valve in coöperative relation with such seat and port or ports, and adapted for a combined rotary and gyratory motion, said valve having a stem projecting through an opening in said seat and provided with a central recess and a bevel gear, a valve shaft provided with a crank located within said central recess of said valve stem, and having a ball-bearing connection with said valve stem affording support to said valve, means for rotating said shaft, means for adjusting the vertical position of such shaft, and a normally fixed bevel gear intermeshing with the bevel gear carried by said valve stem, whereby as the valve gyrates it is also caused to rotate.

22. The combination with an engine cylinder having a valve seat and one or more ports therein, of a valve seated on said valve seat and adapted for combined rotary and gyratory motion, said valve provided with a stem having a central recess, and a rotary valve shaft provided with an eccentric located within the central recess of said valve stem and having a rotary-bearing connection with said valve stem, intermeshing gears, one of which is mounted upon said valve, said gears arranged to enforce rotation of the valve as it gyrates, said shaft having an internal lubricant duct arranged to supply lubricant to said bearing and gears.

In testimony whereof I have signed this specification in the presence of two subscribing witnesses.

FRANK W. OFELDT.

Witnesses:
H. M. MARBLE,
PAUL H. FRANKE.